Jan. 9, 1968  L. A. DE LATEUR  3,363,149
TRIP CIRCUIT
Filed May 18, 1965
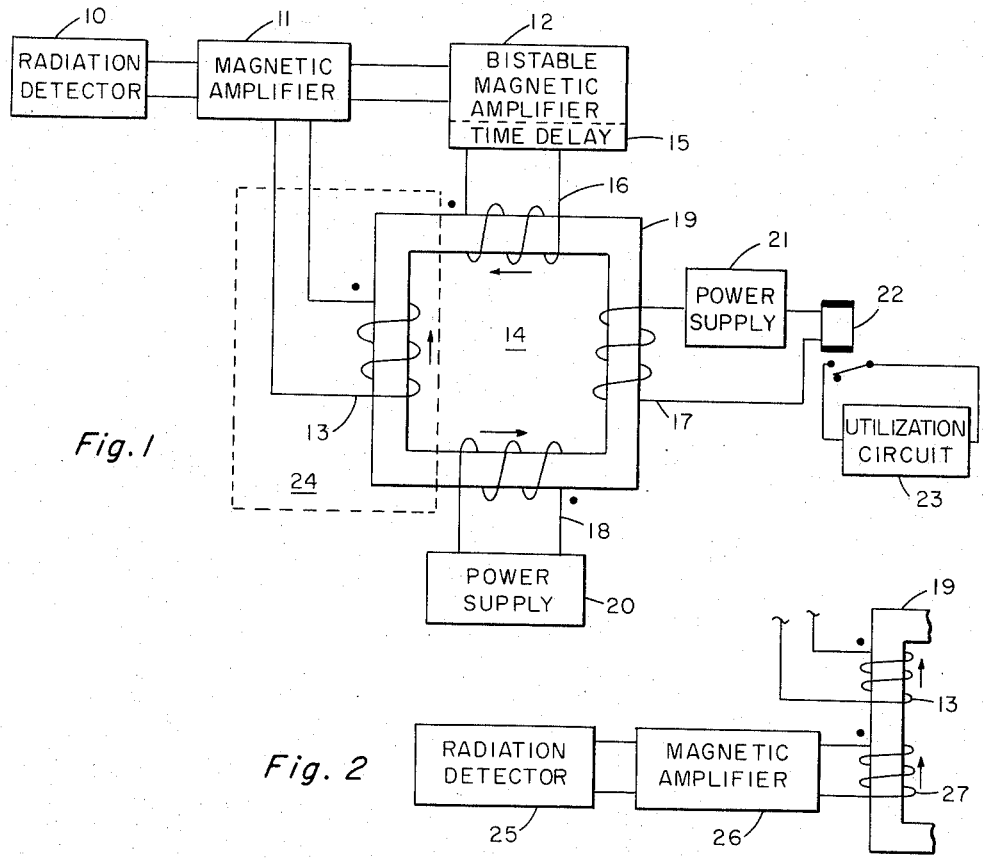
Fig. 1
Fig. 2
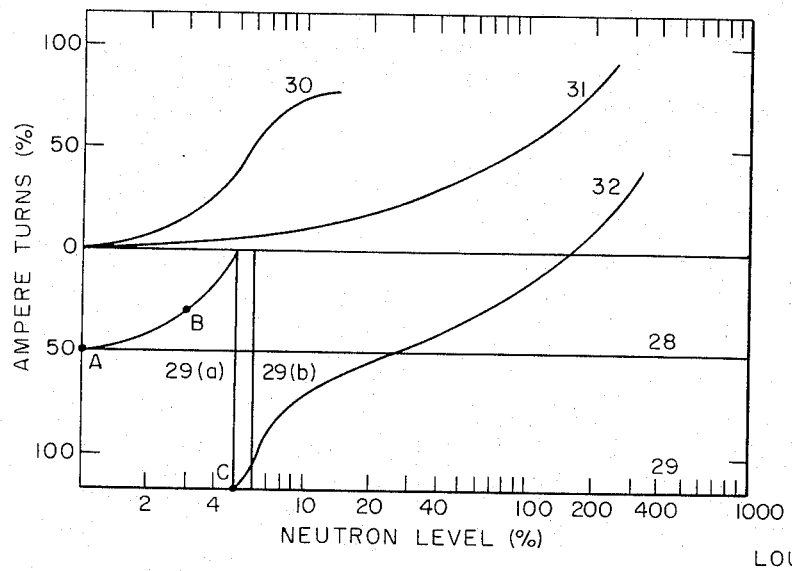
Fig. 3
INVENTOR.
LOUIS A. DeLATEUR
BY United States Patent Office 3,363,149
Patented Jan. 9, 1968

3,363,149
TRIP CIRCUIT
Louis A. De Lateur, Sunnyvale, Calif., assignor to the United States of America as represented by the United States Atomic Energy Commission
Filed May 18, 1965, Ser. No. 456,875
6 Claims. (Cl. 317—148)

This invention relates to a magnetic amplifier tripping circuit that generates a tripping signal whenever the input signal increases faster than a predetermined adjustable amount for a given period of time. More particularly, this invention relates to a magnetic amplifier tripping circuit for actuating the safety system of a nuclear reactor for a low level short reactor period and at the same time being capable of providing a trip for high level neutron flux.

Magnetic amplifier tripping circuits inherently have greater stability and reliability over the conventional vacuum tube amplifiers which were subject to failure and drift resulting from shock, breakage, again, warping and normal consumption of the elements under the influence of temperature and other changes.

In a conventional nuclear reactor neutron level monitoring system, the system usually employs separate neutron flux detectors for the low flux level, start up range, and for the high flux level, power range due to the limitations in sensitivity and accuracy of neutron detectors over wide ranges of neutron flux. These systems require a multiplicity of circuits and components to monitor these ranges of flux level in order to provide for a period or rate trip for actuating the reactor shut-down or "scram" circuits, in the start up range and a high flux trip in the power range. The period or rate trip was provided by a differentiating circuit which at low neutron levels tended to generate spurious trips from inherent signal noise. Some of these systems are further complicated by requiring a logarithmic amplifier for a period or rate trip and separate non-logarithmic amplifiers for high level trips. Other systems provide a period or rate trip in both the low and high flux levels using the same circuitry, the latter of which is undesirable since the excessive change in rate or reactor period resulting in a period or rate trip is a problem primarily at the low flux level and trip on the high level for this reason would cause an unneeded shutdown of the reactor.

Applicant has for an object of his invention the provision of a rate of change trip circuit for a nuclear reactor scram system which does not require a conventional differentiating circuit.

Applicant has for another object of his invention the provision of a trip circuit that provides a trip for a short reactor period in the low neutron flux range for actuating the scram system of a nuclear reactor.

Applicant has as another object of his invention the provision of a trip circuit for a nuclear reactor scram system which can monitor more than one radiation detector at a time and provide a trip upon either detector indicating a scram condition.

Applicant has an another object of his invention the provision of a trip circuit which employs a magnetic amplifier, thereby overcoming failures resulting from shock and deteriorating qualities of the vacuum tube.

Applicant has as a further object of his invention the provision of a trip circuit for a nuclear reactor control system which is simple in construction, reliable in operation, substantially free from maintenance problems, and uniform in characteristics.

Other objects and advantages of this invention will appear from the following specification and accompanying drawings, and the novel features thereof will be particularly pointed out in the appended claims.

In the drawings, FIG. 1 is a schematic diagram of a trip circuit embodying this invention. FIG. 2 is a schematic diagram of a modification of the circuit illustrated in FIG. 1. FIG. 3 is a graph of percentage of ampere-turns plotted against the percentage of the neutron flux level for a nuclear reactor illustrating the operation of this invention.

FIG. 1 illustrates an embodiment of this invention having a magnetic amplifier tripping circuit which generates a trip signal whenever the neutron flux measured by radiation detector 10 increases faster than a predetermined rate for a given period of time.

The output of radiation detector 10, which may be a conventional ion chamber type having unidirectional current output proportional to the low level neutrons flux in a nuclear reactor, is connected to linear amplifier 11. The output of linear amplifier 11 is connected to bistable amplifier 12 and to winding 13 of trip magnetic amplifier 14. The output of bistable amplifier 12 is in turn connected through a variable time delay 15 to winding 16 of trip magnetic amplifier 14.

Linear amplifier 11 and bistable amplifier 12 may take various forms, preferably magnetic amplifiers, and may be connected in a variety of different ways as is well known in the art. Bistable amplifier 12 may be a conventional bistable circuit which has an adjustable trip level. See Magnetic Amplifier Circuits, second edition, by Geyger published by McGraw-Hill Book Company, New York, N.Y. Time delay 15 may be a conventional L/R delay circuit with an adjustable time delay.

Trip magnetic amplifier 14 is made up of a number of windings 13, 16, 17 and 18 disposed on a magnetic core 19. In the embodiment illustrated, windings 16 and 18 are wound in inductive opposition to winding 13 as conventionally illustrated by dots at one end of each winding. Winding 18 is connected to an adjustable unidirectional current power supply 20 to provide an inductive bias to core 19. Winding 17 is connected to a power supply 21 through a pull-in relay 22. The contacts of relay 22, when relay 22 is energized, complete a circuit through a utilization circuit 23 such as a scram system for a nuclear reactor of the type described in Patent No. 3,035,996 to Gale W. Lees et al. Winding 17 may take various forms, depending on relay 22 and the circuitry used in utilization circuit 23 such as two opposing windings as illustrated in the aforementioned U.S. Patent No. 3,035,996. Winding 17 and relay 22 may be connected so as to trip a reactor scram upon any number of inductive conditions of core 19 such as zero ampere turns or saturation in either direction. Winding 16 is wound with sufficient turns so that when bistable magnetic amplifier 12 is tripped and the delay period of time delay 15 is passed the ampere-turns of winding 16 are greater and opposite to the maximum ampere-turns of winding 13.

FIG. 2 illustrates a modification of magnetic amplifier 14 within the dotted lines 24 of FIG. 1. The output of radiation detector 25, which may be a conventional ion chamber type having a unidirectional current output proportional to the high level neutron flux in a nuclear reactor, is connected to linear amplifier 26. The output of linear amplifier 26 is in turn connected to winding 27 on core 19. Amplifier 26 can be of the same type as amplifier 12. Winding 27 is wound in inductive aiding to winding 13.

FIG. 3 illustrates a graph showing the operation of magnetic amplifier 14 as a plot of percentage of saturation ampere-turns against percentage of the reactor operating neutron level (on a logarithmic scale) assuming a trip of scram system 21 which a zero ampere turn condition of core 19. Curve 28 shows the percentage ampere-turns contribution of bias winding 18 to core 19. Curve 29 shows the percentage ampere-turns contribution of tripped winding 16 to core 19. Curves 29(a) and 29(b) illustrate two situations where the neutron flux monitored by detector 10 is increasing at different rates, showing that the energization of winding 16 will occur at different percentages of neutron flux. Curve 30 shows the percentage ampere-turns contribution of winding 13 with an assumed saturating characteristic of amplifier 11. Curve 31 shows the percentage ampere-turns contribution of winding 27 to core 19 resulting from the output of amplifier 26. Curve 32 shows the resultant percentage ampere-turns of all the windings in an assumed operating sequence. The curve 32 is shown as an illustration of one operating sequence of amplifier 14. It is readily seen that this sequence can be varied in one or more different ways such as by varying the bias on winding 18, the delay of time delay 15, the trip level of amplifier 12, or the condition on which scram system 21 trips.

The operation of this invention can best be understood by reference to all three figures. Winding 18 when energized negatively biases core 19. Winding 16 when energized by tripped bistable magnetic amplifier 12 drives core 19 into negative saturation. Winding 13 when energized by the ouput of amplifier 11 opposes the ampere-turns of bias winding 18. As shown by curve 28 in FIGURE 3, the ampere-turns of tripped winding 16 offset the maximum ampere-turns of winding 13 at the saturation point of amplifier 11. This maximum level can be predetermined by calculation or experimentation and the turns of winding 16 and the output current of amplifier 12 so chosen to offset this level when amplifier 12 trips. Winding 27 operates in the same manner as winding 13.

As noted above, the output of amplifier 11 and radiation detector 10 represents the neutron flux of a nuclear reactor in the low level flux range. This is shown in the FIG. 3 to be about 10% of neutron level of the reactor. The output of amplifier 26 and radiation detector 25 represents the neutron flux in the entire range providing a signal well above the 100% neutron flux operating level of the reactor.

During reactor startup, the resultant magnetomotive force in core 19 begins at point A on curve 32 due to the bias winding 18. As the neutron flux increases, the ampere-turns induced by windings 13 and 27 from detectors 10 and 25 increases proportionally. Assuming that bistable magnetic amplifier 12 is set to trip at the 3 percent neutron flux level indicated at point B, winding 16 is energized a predetermined time after the trip of amplifier 12 as set by time delay 15. If the neutron flux level is increased at a normal rate, the resulting percentage of ampere-turns represented by curve 32 will follow curve 29(a) preventing the energizing of relay 22 by not reaching a zero flux condition. However, if the neutron flux level is increasing too fast, the resulting percentage of ampere-turns reaches zero before winding 16 is energized, as represented by curve 29(b), causing relay 22 to close actuating utilization circuit 23. Assuming no low level short reactor period scram, the resulting ampere-turns in core 19 then increases from point C on curve 32 proportional to the ampere-turns induced by windings 13 and 27 until amplifier 11 saturates and from there proportional to the winding 27 ampere-turns. If the resultant ampere-turns of core 19 reaches zero caused by an increase of the high level neutron flux of the reactor over 100 percent of the operating level to some predetermined level such as 150 percent, scram system 21 is tripped.

As can be readily seen, trip magnetic amplifier 14 can be used to monitor any electrical signal and indicate whether the signal is increasing faster or slower than a predetermined rate. Thus, amplifier 14 is capable of detecting the time rate of change of an increasing electrical signal over a wide range of adjustable time periods and signal levels.

It will be understood that various changes in the details, materials and arrangements of the parts, which have been herein described and illustrated in order to explain the nature of the invention may be made by those skilled in the art within the principles and scope of the invention as expressed in the appended claims.

What is claimed is:

1. A time varying signal rate of change trip circuit comprising:
    (a) a magnetic core having a first primary winding, a second opposing primary winding, a bias winding and a secondary winding,
    (b) means for coupling said time varying signal to said first primary winding,
    (c) means coupled to said second primary winding for inducing a greater opposing magnetomotive force in said core than said first primary winding, a given period of time after said signal reaches a predetermined level,
    (d) means for applying an adjustable bias current to said bias winding, and
    (e) means coupled to said secondary winding for indicating a predetermined magnetomotive force condition of said core when said signal exceeds a given rate of change.

2. A trip circuit as described in claim 1 having means for varying the time period of said inducing means.

3. A trip circuit as described in claim 2 having means for varying the level at which said time period begins.

4. A neutron level signal rate of change trip circuit for a nuclear reactor safety system comprising:
    (a) a magnetic core having a first and second opposing primary windings, a bias winding and a secondary winding,
    (b) means for applying an adjustable bias current to said bias winding,
    (c) means coupled to said second primary winding for inducing a greater opposing magnetomotive force in said core than said first primary winding, said inducing means having an adjustable time delay and an adjustable trip point wherein said second primary winding is energized a given time after said neutron level reaches a predetermined level,
    (d) means for coupling said neutron level signal to said first primary winding and to said inducing means; and
    (e) means coupled to said secondary winding for indicating a predetermined magnetomotive force condition of said core when said neutron level increases faster than a given rate of change.

5. A low and high level neutron flux signal trip circuit for a nuclear reactor safety system comprising:
    (a) a magnetic core having a first and second aiding primary windings, a third opposing primary winding, a bias winding and a secondary winding,
    (b) means for applying an adjustable bias current to said bias winding,
    (c) means coupled to said third primary winding for inducing a greater opposing magnetomotive force in said core than said first primary winding, said inducing means having an adjustable time delay and an adjustable trip point wherein said third primary winding is energized a given time after said neutron level reaches a predetermined level,
    (d) means for coupling said low level neutron flux signal to said first primary winding and to said inducing means, (e) means for coupling said high level neutron flux signal to said second primary winding, and (f) means coupled to said secondary winding for indicating a predetermined magnetomotive force condition of said core when said low level neutron flux signal increases faster than a given rate of change and when said high level neutron flux exceeds a given level.

6. A trip circuit as described in claim 5 wherein said low level neutron flux signal coupling means includes a magnetic amplifier saturable at a predetermined signal level.

References Cited

UNITED STATES PATENTS 3,159,767 12/1964 Secunde et al. ------ 317—148 X
3,225,268 12/1965 Metzadour -------- 317—148 X LEE T. HIX, *Primary Examiner.*